(12) United States Patent  
Tasaka et al.

(10) Patent No.: US 10,344,169 B2
(45) Date of Patent: Jul. 9, 2019

(54) FREE-RADICAL POLYMERIZATION METHODS AND ARTICLES THEREBY

(71) Applicant: 3M INNOVATIVE PROPERTIES COMPANY, St. Paul, MN (US)

(72) Inventors: Yoshihiko Tasaka, Tokyo (JP); Zachary J. Thompson, Woodbury, MN (US); Jun Fujita, Tokyo (JP); Takahiro Kasahara, Tokyo (JP); Sotaro Endo, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 171 days.

(21) Appl. No.: 15/508,360

(22) PCT Filed: Sep. 28, 2015

(86) PCT No.: PCT/US2015/052654
§ 371 (c)(1),
(2) Date: Mar. 2, 2017

(87) PCT Pub. No.: WO2016/053877
PCT Pub. Date: Apr. 7, 2016

(65) Prior Publication Data
US 2017/0247547 A1    Aug. 31, 2017

Related U.S. Application Data

(60) Provisional application No. 62/057,634, filed on Sep. 30, 2014.

(51) Int. Cl.
*C08F 220/34*    (2006.01)
*C08F 20/54*    (2006.01)
(Continued)

(52) U.S. Cl.
CPC ............... *C09D 4/00* (2013.01); *B05D 1/28* (2013.01); *B05D 7/544* (2013.01); *C08F 220/34* (2013.01); *C09D 133/08* (2013.01); *G02B 5/30* (2013.01)

(58) Field of Classification Search
None
See application file for complete search history.

(56) References Cited

U.S. PATENT DOCUMENTS 3,218,305 A * 11/1965 Krieble .................. C08F 20/20
156/332
3,347,954 A * 10/1967 Bredereck ................ C08F 2/44
525/21
(Continued)

FOREIGN PATENT DOCUMENTS

EP    201031 B1    4/1986
EP    201778 B1    4/1986
(Continued)

OTHER PUBLICATIONS

3M Surface Preparation for 3M™ VHB™ Tape Applications, Technical Bulletin, Dec. 2012, 4 pages.
(Continued)

*Primary Examiner* — Peter A Salamon
(74) *Attorney, Agent, or Firm* — Bradford B. Wright (57) ABSTRACT

A method of curing a curable composition includes contacting the free-radically curable composition with the solid primer layer thereby causing at least partial curing of the curable composition. The solid primer layer includes a binder material, optional beta-dicarbonyl compound, and an organic peroxide. The curable composition includes at least one free-radically polymerizable compound, a polyvalent metal compound, and a quaternary ammonium halide. The
(Continued)

method can be used for adhesive bonding of substrates and preparation of various articles.

9 Claims, 1 Drawing Sheet

(51) Int. Cl.
*C09D 4/00* (2006.01)
*C09D 133/08* (2006.01)
*B05D 1/28* (2006.01)
*B05D 7/00* (2006.01)
*G02B 5/30* (2006.01)

(56) References Cited

U.S. PATENT DOCUMENTS

| | | | |
|---|---|---|---|
| 4,032,594 A | 6/1977 | Serratore | |
| 4,180,640 A * | 12/1979 | Melody | C09J 4/00 156/310 |
| 4,287,330 A * | 9/1981 | Rich | C09J 4/00 523/176 |
| 4,321,349 A * | 3/1982 | Rich | C09J 4/00 523/176 |
| 4,356,296 A | 10/1982 | Griffith | |
| 4,473,671 A | 9/1984 | Green | |
| 4,539,048 A | 9/1985 | Cohen | |
| 4,642,126 A | 2/1987 | Zador | |
| 4,648,843 A | 3/1987 | Mitra | |
| 4,652,274 A | 3/1987 | Boettcher | |
| 4,665,217 A | 5/1987 | Reiners | |
| 4,752,338 A | 6/1988 | Reiners | |
| 4,837,286 A * | 6/1989 | Kato | B29C 67/246 526/217 |
| 5,026,902 A | 6/1991 | Fock | |
| 5,076,844 A | 12/1991 | Fock | |
| 5,252,629 A | 10/1993 | Imai | |
| 5,811,473 A * | 9/1998 | Ramos | C09J 5/02 510/256 |
| 6,552,140 B1 * | 4/2003 | Kneafsey | C08F 2/38 525/309 |
| 6,605,651 B1 * | 8/2003 | Stangel | A61K 6/083 522/103 |
| 6,852,775 B1 | 2/2005 | Soglowek | |
| 2003/0215635 A1 | 11/2003 | Johnson | |
| 2007/0042282 A1 | 2/2007 | Molaire et al. | |
| 2009/0192239 A1 | 7/2009 | Hecht | |
| 2011/0313078 A1 | 12/2011 | Vogt | |
| 2012/0231286 A1 * | 9/2012 | Attarwala | C08F 222/1006 428/522 |
| 2017/0247547 A1 * | 8/2017 | Tasaka | C08F 220/34 |

FOREIGN PATENT DOCUMENTS

| | | |
|---|---|---|
| EP | 373384 B1 | 10/1992 |
| GB | 1293209 | 10/1972 |
| GB | 1417088 | 12/1975 |
| JP | 2005-255654 | 9/2005 |
| WO | 2000-038619 | 7/2000 |
| WO | 2000-042092 | 7/2000 |
| WO | 2001-007444 | 2/2001 |
| WO | 2001-092271 | 12/2001 |
| WO | 2002-077043 | 10/2002 |
| WO | 2012-138675 | 10/2012 |
| WO | 2013-013589 | 1/2013 |
| WO | 2013-126377 | 8/2013 |
| WO | 2014-151650 | 9/2014 |
| WO | 2016-014218 | 1/2016 |
| WO | 2016-044151 | 3/2016 |
| WO | 2016-200941 | 12/2016 |

OTHER PUBLICATIONS

3M™ Primer 94 (Ampoules), Safety Data Sheet, Apr. 15, 2014, pp. 1-18.
3M™ Silane Glass Treatment AP115, Safety Data Sheet, Jun. 16, 2014, pp. 1-10.
Bredereck, "Autoxidation CH-Active Polymerization Initiators: XIV$^{th}$ Report Polymerizations and Polymerization Inhibitors", Macromolecular Chemistry, 1966, vol. 99, pp. 96-102.
Bredereck, "Regarding CH-active polymerization initiators", Die Makromolekulare Chemie, 1966, vol. 92, pp. 70-90.
Rosen, "Single-Electron Transfer and Single-Electron Transfer Degenerative ChainTransfer Living Radical Polymerization", Chem. Rev., 2009, vol. 109, pp. 5069-5119.
International Search report for PCT international Application No. PCT/US2015/052654 dated Jan. 8, 2016.

* cited by examiner

FREE-RADICAL POLYMERIZATION METHODS AND ARTICLES THEREBY

TECHNICAL FIELD

The present disclosure relates broadly to free-radical polymerization methods, free-radically polymerizable curable compositions, and articles made therefrom.

BACKGROUND

Many vinyl compounds are polymerizable by free-radicals. Examples include acrylates and methacrylates, acrylamides and methacrylamides, allyl ethers, and styrenes.

Free-radical polymerization of vinyl compound(s) using certain beta-dicarbonyl (i.e., 1,3-dicarbonyl) compounds in the presence of a peroxide and/or molecular oxygen, a halide salt, and a copper compound such as copper acetylacetonate, has been described in U.S. Pat. No. 3,347,954 (Bredereck et al.). Such compositions cause free-radical polymerization of the vinyl compound(s) over time, with shorter times generally being preferred. Since the compositions are spontaneously reactive, it is common practice to provide them as a two-part system such as, for example, a part A and a part B that are combined immediately prior to use.

Organocopper compounds such as copper acetylacetonate may contain copper in a +1 or +2 oxidation state, and typically have good solubility in many organic systems. However, a typical problem of including such copper compounds in curable compositions is that they are prone to color formation, and may not be suitable for use in applications where absence of color is desirable for aesthetic and/or functional reasons.

Air-activated initiator systems are useful for polymerizing acrylic monomers in applications where oxygen-inhibition of the polymerization reaction is a concern. Two-part acrylic structural adhesives and liquid optically clear adhesives (LOCA) present specific examples where oxygen inhibition produces an undesirable tacky surface.

It would be desirable to have new methods for curing air-activated free-radically polymerizable systems such as, for example, those described above, especially if they provide extended shelf life prior to curing on a substrate.

SUMMARY

The present disclosure overcomes the above problem by including a beta-diketone compound in a solid primer layer on a substrate to which the curable composition is to be bonded. When the components of the curable composition contact the beta-diketone compound initiation of free-radical polymerization occurs, thereby at least partially curing the curable composition. Typically, the beta-diketone is present in the solid primer layer but not in the curable composition, however a minor amount of the beta-diketone may be included as long as it does not substantially shorten the desired shelf life or adversely affect the aesthetics or adhesion of the curable composition.

In a first aspect, the present disclosure provides a method of curing a curable composition, the method comprising:
a) providing the curable composition, wherein the curable composition comprises:
   a free-radically polymerizable compound; and
   a quaternary ammonium halide;
   a polyvalent metal compound for free-radically curing the curable composition; and
b) providing a substrate having a solid primer layer disposed on at least a portion thereof, wherein the solid primer layer comprises:
   a binder material;
   an organic peroxide; and
c) contacting the curable composition with at least a portion of the solid primer layer, thereby causing at least partial curing of the curable composition.

In a second aspect, the present disclosure provides an article comprising:
a first substrate having a surface having a solid primer layer disposed on at least a portion thereof, wherein the solid primer layer comprises a binder material and an organic peroxide; and
a polymerized reaction product of the organic peroxide and a curable composition, wherein the curable composition comprises:
   a free-radically polymerizable compound; and
   a quaternary ammonium halide; and
   a polyvalent metal compound for free-radically curing the curable composition.

Advantageously, the present inventors have found addition of organic peroxide and optional beta-dicarbonyl to the solid primer layer may improve shelf life of the curable composition and/or reduce the amount of polyvalent metal ion (e.g., Cu) needed in the curable composition, thereby improving the aesthetics or optical clarity of the curable composition, and may reduce the halide content of the curable composition, thereby minimizing the possibility of corrosion of surfaces in contact with the curable composition. As used herein, the prefix "(meth)acryl" refers to acryl and/or methacryl. For example, (meth)acrylate refers to acrylate and/or methacrylate.

As used herein, the term "hydrocarbyl" refers to a monovalent group derived from a hydrocarbon. Examples include methyl, phenyl, and methylcyclohexyl.

As used herein, the term "hydrocarbylene" refers to a divalent group derived from a hydrocarbon. Examples include methylene, phenylene, and 1,3-propane-diyl.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The FIGURE may not be drawn to scale.

DETAILED DESCRIPTION

The present disclosure concerns methods for curing free-radically polymerizable compositions using a polyvalent metal compound-based initiator system. Curing is effected by free-radical polymerization once the polyvalent metal compound in the curable composition is brought into contact with the organic peroxide and optional beta-diketone in the solid primer layer.

The curable composition comprises at least one free-radically polymerizable compound, which may comprise at least one of (meth)acrylates, (meth)acrylamides, other vinyl compounds, and combinations thereof. Useful free-radically polymerizable compounds may comprise an ethylenically-unsaturated compound having one or more (e.g., one, two, three, four, or more) free-radically polymerizable groups.

Examples of suitable (meth)acrylates include mono-, di-, and poly-(meth)acrylates and (meth)acrylamides such as, for example, 1,2,4-butanetriol tri(meth)acrylate, 1,3-butylene glycol di(meth)acrylate, 1,3-propanediol di(meth)acrylate, 1,4-butanediol di(meth)acrylate, 1,4-cyclohexanediol di(meth)acrylate, 1,6-hexanediol di(meth)acrylate, 1,6-hexanediol monomethacrylate monoacrylate, 2-phonexyethyl (meth)acrylate, alkoxylated cyclohexanedimethanol di(meth)acrylates, alkoxylated hexanediol di(meth)acrylate, alkoxylated neopentyl glycol di(meth)acrylate, allyl (meth)acrylate, bis[1-(2-(meth)acryloxy)]-p-ethoxyphenyldimethylmethane, bis[1-(3-(meth)acryloxy-2-hydroxy)]-p-propoxyphenyldimethylmethane, caprolactone modified dipentaerythritol hexa(meth)acrylate, caprolactone modified neopentyl glycol hydroxypivalate di(meth)acrylate, cyclohexanedimethanol di(meth)acrylate, diethylene glycol di(meth)acrylate, dipentaerythritol penta(meth)acrylate, dipropylene glycol di(meth)acrylate, ditrimethylolpropane tetra(meth)acrylate, ethoxylated (10) bisphenol A di(meth)acrylate, ethoxylated (20) trimethylolpropane tri(meth)acrylate, ethoxylated (3) bisphenol A di(meth)acrylate, ethoxylated (3) trimethylolpropane tri(meth)acrylate, ethoxylated (30) bisphenol A di(meth)acrylate, ethoxylated (4) bisphenol A di(meth)acrylate, ethoxylated (4) pentaerythritol tetra (meth)acrylate, ethoxylated (6) trimethylolpropane tri(meth)acrylate, ethoxylated (9) trimethylolpropane tri(meth)acrylate, ethoxylated bisphenol A di(meth)acrylate, ethyl (meth)acrylate, ethylene glycol di(meth)acrylate, 2-ethylhexyl (meth)acrylate, glycerol tri(meth)acrylate, hydroxypivalaldehyde modified trimethylolpropane di(meth)acrylate, octyl (meth)acrylate, nonyl (meth)acrylate, decyl (meth)acrylate, lauryl (meth)acrylate, tridecyl (meth)acrylate, isobornyl (meth)acrylate, isopropyl (meth)acrylate, methyl (meth) acrylate, neopentyl glycol di(meth)acrylate, n-hexyl (meth) acrylate, pentaerythritol tetra(meth)acrylate, pentaerythritol tri(meth)acrylate, polyethylene glycol (200) di(meth)acrylate, polyethylene glycol (400) di(meth)acrylate, polyethylene glycol (600) di(meth)acrylate, propoxylated (3) glyceryl tri(meth)acrylate, propoxylated (3) trimethylolpropane tri (meth)acrylate, propoxylated (5.5) glyceryl tri(meth)acrylate, propoxylated (6) trimethylolpropane tri(meth)acrylate), propoxylated neopentyl glycol di(meth)acrylate, sorbitol hexa(meth)acrylate, stearyl (meth)acrylate, tetraethylene glycol di(meth)acrylate, tetrahydrofurfuryl (meth)acrylate, tricyclodecanedimethanol di(meth)acrylate, triethylene glycol di(meth)acrylate, trimethylolpropane tri(meth)acrylate, tripropylene glycol di(meth)acrylate, tris(2-hydroxyethyl) isocyanurate tri(meth)acrylate, (meth)acrylamide, N,N-dimethylacrylamide, N-vinylpyrrolidone, N-vinylcaprolactam, methylene bis(meth)acrylamide, diacetone (meth)acrylamide, (meth)acryloylmorpholine, urethane (meth)acrylates, polyester (meth)acrylates, epoxy (meth)acrylates, copolymerizable mixtures of (meth)acrylated monomers such as those in U.S. Pat. No. 4,652,274 (Boettcher et al.), (meth) acrylated oligomers such as those of U.S. Pat. No. 4,642,126 (Zador et al.), and poly(ethylenically-unsaturated) carbamoyl isocyanurates such as those disclosed in U.S. Pat. No. 4,648,843 (Mitra).

Examples of suitable free-radically polymerizable vinyl compounds include styrene, diallyl phthalate, divinyl succinate, divinyl adipate, and divinyl phthalate. Other suitable free-radically polymerizable compounds include siloxane-functional (meth)acrylates as disclosed, for example, in PCT Published Application Nos. WO 00/38619 (Guggenberger et al.), WO 01/92271 (Weinmann et al.), WO 01/07444 (Guggenberger et al.), WO 00/42092 (Guggenberger et al.), and fluoropolymer-functional (meth)acrylates as disclosed, for example, in U.S. Pat. No. 5,076,844 (Fock et al.), U.S. Pat. No. 4,356,296 (Griffith et al.), EP 0 373 384 (Wagenknecht et al.), EP 0 201 031 (Reiners et al.), and EP 0 201 778 (Reiners et al.).

Suitable free-radically polymerizable compounds may contain hydroxyl groups and free-radically active functional groups in a single molecule. Examples of such materials include hydroxyalkyl (meth)acrylates such as 2-hydroxyethyl (meth)acrylate, 4-hydroxybutylate, poly(propyleneglycol) (meth)acrylate, 2-hydroxypropyl (meth)acrylate, glycerol mono- or di-(meth)acrylate, trimethylolpropane mono- or di-(meth)acrylate, pentaerythritol mono-, di-, and tri-(meth)acrylate, sorbitol mono-, di-, tri-, tetra-, or penta-(meth)acrylate, and 2,2-bis[4-(2-hydroxy-3-methacryloxypropoxy)phenyl]propane (bisGMA).

Suitable free-radically polymerizable compounds are available from a wide variety of commercial sources such as, for example, Sartomer Co., Exton, Pa., or can be made by known methods.

Typically, the curable composition includes a sufficient quantity of free-radically polymerizable compound(s) to provide the desired setting or hardening rate and desired overall properties following curing/hardening. Mixtures of free-radically polymerizable compounds can be used if desired.

Typically, the amount of free-radically polymerizable compound(s) is from 40 to 99.9 percent by weight, preferably 70 to 99 percent by weight, and more preferably from 80 to 95 percent by weight of the curable composition; however, this is not a requirement.

The curable composition further comprises a quaternary ammonium halide that is at least partially soluble in the curable composition. The quaternary ammonium halide may accelerate the free-radical polymerization rate. Suitable quaternary ammonium halides include those having four hydrocarbyl (e.g., alkyl, alkenyl, cycloalkyl, aralkyl, alkaryl, and/or aryl) groups. Preferably, the hydrocarbyl groups are independently selected from hydrocarbyl groups having from 1 to 18 carbon atoms, more preferably 1 to 12 carbon atoms, and more preferably 1 to 4 carbon atoms. Examples of suitable hydrocarbyl groups include methyl, ethyl, propyl, butyl, hexyl, octyl, dodecyl, hexadecyl, and octadecyl, benzyl, phenyl, tolyl, cyclohexyl, and methylcyclohexyl. Exemplary suitable quaternary ammonium compounds include tetramethylammonium halides, tetraethylammonium halides, tetrapropylammonium halides, tetrabutylammonium halides, ethyltrimethylammonium halides, diethyldimethylammonium halides, trimethylbutylammonium halides, trioctylmethylammonium halides, and benzyltributylammonium halides. Any halide (e.g., F, Cl, Br, I) ion may be used in the quaternary ammonium halide, but preferably the halide ion is chloride or bromide.

The quaternary ammonium salt may be present in the curable composition in any amount, but preferably in an amount of from 0.01 to 5 percent by weight, preferably 0.1 to 2 percent although other amounts may also be used.

Useful polyvalent metal compounds for inclusion in the curable composition include those metal salts, complexes and/or chelates (preferably soluble in the curable composition) that are known for use in cure systems of the types disclosed herein. Examples include salts, chelates, and/or complexes of organic anions (e.g., conjugate bases of organic acids having from 1 to 18 carbon atoms) with polyvalent metals with such as copper (II) (e.g., copper (II) acetylacetonate, copper (II) naphthenate, copper (II) acetate, copper (II) (meth)acrylate, copper (II) salicylate, and complexes of copper with thiourea or ethylenediaminetetraacetic acid), cobalt (II) and cobalt (III)(e.g., cobalt (II) octoate, cobalt (II) succinate cobalt (II) naphthenate, cobalt (II) resinate, and cobalt (II) linoleate, dicarboxylic acid semiesters and compounds with chelate-like bound cobalt of the type of cobalt acetoacetic ester and cobalt (II) bis (acetylacetonate), cobalt (III) tris(acetylacetonate), and cobalt chelates of 2-acetylcyclopentanone and cyclopentanone-2-carboxylic acid methyl ester); iron (III) (e.g., iron (III) (meth)acrylate, iron (III) acetoacetonate), manganese (II) (e.g., manganese (II) bis(acetylacetonate)), manganese (III) (e.g., manganese (III) tris(acetylacetonate)), and cobalt (III) (e.g., cobalt (III) tris(acetylacetonate)). Further examples include chlorides, hydroxides, carbonates, bicarbonates, sulfates, nitrates, and acetates of copper (II) or copper (III), cobalt (II) and cobalt (III), iron (II) and iron (III), manganese (II) and manganese (III). Other heavy polyvalent metals may also be used, provided that they are capable of promoting curing of the curable composition.

The polyvalent metal compound may be added to the curable composition in any efficacious amount. Preferably, the amount of the polyvalent metal compound added to the curable composition lies in the range of 0.0005 to 0.5 percent by weight, preferably 0.0005 to 0.05 percent by weight for copper and cobalt compounds, and from 0.005 to 0.5 percent by weight for iron and manganese compounds.

Curable compositions according to the present disclosure may optionally include additives such, as for example, one or more fillers, antioxidants, plasticizers, tackifiers, photoinitiators, thickeners, fragrances, hindered amine light stabilizers (HALS), UV stabilizers, inhibitors (e.g., which may accompany free-radically polymerizable compounds), coating aids, thixatropes, coupling agents, toughening agents, or a combination thereof. Examples of fillers include silica, clays, and surface modified clays. Exemplary toughening agents include elastomeric materials such as various synthetic rubbers (e.g., methyl methacrylate-butadiene-styrene (MBS) copolymers, acrylonitrile-butadiene-styrene (ABS) copolymers, linear polyurethanes, acrylonitrile-butadiene rubbers, styrene-butadiene rubbers, chloroprene rubbers, butadiene rubbers, and natural rubbers. Among them, acrylonitrile-butadiene rubbers are particularly useful because of their typically good solubility in the curable composition. Tougheners may be used alone or in combination.

The curable composition may optionally contain at least one photoinitiator for free-radical polymerization (i.e., a free-radical photoinitiator).

Exemplary photoinitiators for initiating free-radical polymerization include benzoin and its derivatives such as alpha-methylbenzoin; alpha-phenylbenzoin; alpha-allylbenzoin; alpha-benzylbenzoin; benzoin ethers such as benzil dimethyl ketal (available, for example, as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation DAROCUR 1173 from Ciba Specialty Chemicals) and 1-hydroxycyclohexyl phenyl ketone (available, for example, as IRGACURE 184 from Ciba Specialty Chemicals); 2-methyl-1-[4-(methylthio)phenyl]-2-(4-morpholinyl)-1-propanone (available, for example, under the trade designation IRGACURE 907 from Ciba Specialty Chemicals); 2-benzyl-2-(dimethylamino)-1-[4-(4-morpholinyl)phenyl]-1-butanone (available, for example, as IRGACURE 369 from Ciba Specialty Chemicals). Other useful photoinitiators include pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinonehalomethyltriazines; benzophenone and its derivatives; iodonium salts and sulfonium salts as described hereinabove; titanium complexes such as bis(eta-5-2,4-cyclopentadien-1-yl)bis[2,6-difluoro-3-(1H-pyrrol-1-yl)phenyl]titanium (available, for example, as CGI 784 DC, also from Ciba Specialty Chemicals); halomethylnitrobenzenes such as, for example, alpha-bromomethylnitrobenzene; mono- and bis-acylphosphines (available, for example, from Ciba Specialty Chemicals as IRGACURE 1700, IRGACURE 1800, IRGACURE 1850, and DAROCUR 4265), and acylphosphine oxides (e.g., available, for example, from BASF Corp., Florham Park, N.J., as LUCIRIN TPO).

If present, the amount of photoinitiator may be from 0.001 to 10 percent by weight, preferably 0.1 to 5 percent by weight, based on the total weight of the curable composition.

The curable composition is brought into contact with the optional beta-diketone compound and organic peroxide in the solid primer layer to cause at least partial curing (preferably substantially complete curing) of the curable composition. Optionally, heating of the curable composition while in contact with the solid primer layer may be carried out, although this is typically not necessary.

The solid primer layer comprises at least one organic peroxide (e.g., mono- or multi-functional carboxylic acid peroxyesters(s)), which typically acts to decrease the cure time of the curable composition. Commercially available organic peroxides include, for example, t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, dialkyl peroxydicarbonates, and O,O-alkyl O-alkyl diesters of monoperoxycarbonic acid. Exemplary organic peroxides include diisopropyl peroxydicarbonate, t-butyl peroxyneodecanoate, t-amyl peroxyneodecanoate, maleic acid t-butyl monoperoxyester, t-butyl peroxybenzoate, t-butyl peroxy-2-ethylhexanoate, t-amyl peroxy-2-ethylhexanoate, O-isopropyl O,O-butyl monoperoxycarbonate, dicyclohexyl peroxycarbonate, dimyristyl peroxycarbonate, dicetyl peroxycarbonate, di(2-ethylhexyl) peroxycarbonate, O,O-butyl O-2-ethylhexyl peroxycarbonate, t-butyl peroxy-3,5,5-trimethylhexanoate, t-amyl peroxybenzoate, t-butyl peroxyacetate, di(4-t-butylcyclohexyl) peroxycarbonate, cumyl peroxyneodecanoate, t-amyl peroxypivalate, cumene hydroperoxide, dibenzoyl peroxide, and t-butyl peroxypivalate. Further suitable organic peroxides will be known to one of ordinary skill in the art.

The organic peroxide may be present in the solid primer layer in any amount, but preferably in an amount of from 1 to 50 percent by weight (i.e., dry weight), preferably 20 to 40 percent by weight, although other amounts may also be used.

The solid primer layer may include a beta-dicarbonyl compound represented by the formula or a salt thereof.

$R^1$ and $R^2$ may independently represent a hydrocarbyl group, or a substituted-hydrocarbyl group, having from 1 to 18 carbon atoms. Preferably, $R^1$ and $R^2$ each have from 1 to 12 carbon atoms, more preferably 1 to 8 carbon atoms, and even more preferably 1 to 4 carbon atoms. Exemplary groups $R^1$ and $R^2$ include methyl, ethyl, isopropyl, n-propyl, butyl, pentyl, hexyl, octyl, decyl, dodecyl, hexadecyl, and octadecyl. Generally, the nature of the substituents in the substituted-hydrocarbyl groups (which may be mono-substituted or poly-substituted) is not particularly important, except that substituents that interfere with the free-radical polymerization should be used sparingly or excluded altogether. Exemplary substituted-hydrocarbyl groups include hydroxyhydrocarbyl groups (e.g., hydroxyethyl and hydroxypropyl), alkoxyhydrocarbyl groups (e.g., methoxyethyl and methoxyethoxy), alkanoylhydrocarbyl groups (e.g., acetylethyl and benzoylethyl), haloalkyl groups (e.g., chloroethyl and dichloropropyl), and dialkylaminohydrocarbyl groups (e.g., dimethylaminopropyl and diethylaminoethyl).

In some embodiments, any two of $R^1$, $R^2$, and $R^3$ taken together form a five-membered or six-membered ring. In those embodiments, two of $R^1$, $R^2$ and $R^3$ taken together may represent, for example: a divalent group selected from and combinations thereof, wherein each $R^4$ independently represents H or an alkyl group having from 1 to 18 carbon atoms (preferably an alkyl group having from 1 to 12 carbon atoms, more preferably from 1 to 8 carbon atoms, and more preferably from 1 to 4 carbon atoms), and y is 1, 2, or 3. For example, the beta-dicarbonyl compound may be 2,2-dimethyl-1,3-dioxane-4,6-dione (Meldrum's acid). Exemplary groups $R^4$ include hydrogen, methyl, ethyl, isopropyl, n-propyl, butyl, pentyl, hexyl, octyl, decyl, dodecyl, hexadecyl, and octadecyl. Examples of divalent groups formed by two of $R^1$, $R^2$ and $R^3$ taken together include alkylene, alkyleneoxy, oxycarbonyloxy, carbonylalkylene, alkylenecarbonyloxy, alkyleneoxycarbonyl, alkylene(alkyl)amino, and dialkylene(alkyl)amino. If $R^1$ and $R^2$ taken together form a 5-membered ring, then at least one of $X^1$ or $X^2$ is a covalent bond.

$R^3$ may represent hydrogen or a hydrocarbyl group having from 1 to 18 carbon atoms. Exemplary groups $R^3$ include methyl, ethyl, isopropyl, n-propyl, butyl, pentyl, hexyl, octyl, decyl, dodecyl, hexadecyl, phenyl, cyclohexyl, methylcyclohexyl, and octadecyl. Exemplary substituted hydrocarbyl groups $R^3$ include —$CH_2C(\!=\!O)OR_4$ wherein $R_4$ is as previously defined (e.g., $R_4$ may be H, methyl, ethyl, dodecyl, or octadecyl).

Each of $X^1$ and $X^2$ independently represents a covalent bond, O, S, wherein $R^4$ is as described above.

In some embodiments, the beta-dicarbonyl compound comprises barbituric acid (i.e., $R^3$=H, both of $X^1$ and wherein $R^4$=H, and taken together $R^1$ and $R^2$=carbonyl) or a derivative thereof (e.g., a 1,3-dialkylbarbituric acid). Examples of suitable barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propyl-barbituric acid, 5-ethylbarbituric acid, 5-propylbarbituric acid, 5-butylbarbituric acid, 1-benzyl-5-phenylbarbituric acid, and 1-cyclohexyl-5-ethylbarbituric acid.

In some embodiments, the beta-dicarbonyl compound comprises a substituted or unsubstituted dialkyl 2-acetylsuccinate diester having from 8 to 14 carbon atoms, preferably from 8 to 12 carbon atoms and more preferably 8 to 10 carbon atoms. Examples include dimethyl 2-acetylsuccinate, diethyl 2-acetylsuccinate, and methyl ethyl 2-acetylsuccinate.

Useful salts of beta-dicarbonyl compounds may include alkali metal (e.g., lithium sodium, potassium, or cesium) salts, $NH_4^+$ salts, and 1°, 2°, 3°, and 4° (i.e., primary, secondary, tertiary, and quaternary) organoammonium salts, preferably having from 1 to 24 carbon atoms. Examples include tetrabutylammonium, dibenzyldimethylammonium, benzyltributylammonium, and tetraethylammonium salts.

The beta-dicarbonyl compound may be present in the solid primer layer in any amount, but preferably in an amount of from 0.1 to 20 percent by weight, preferably 1 to 10 percent, by weight although other amounts may also be used.

In some embodiments, the solid primer layer is formed from a primer composition. The primer composition may comprise a binder material (e.g., that comprises a crosslinked or uncrosslinked organic polymer or a precursor thereof), organic peroxide and optional beta-diketone compound, and optional liquid vehicle. Suitable organic polymers are preferably film forming, and may include polyesters, acrylic polymers, polycarbonates, polyacetals, polyvinyl chloride, and polyurethanes, for example.

The primer composition may be prepared by mixing its component parts by conventional means, for example. Upon drying and/or curing the primer composition forms a solid primer on the first substrate. Examples of suitable liquid vehicles include volatile organic solvents (e.g., mineral spirits, alcohols, ketones, and esters), water, and combinations thereof. Coating methods such as those known in the art (e.g., brushing, wiping, and dip coating) are typically effective for applying the primer layer to the substrate, for example.

Exemplary substrates useful for practicing the above embodiments may include: glass (e.g., as plates, sheets, windows), or electronic display windows (e.g., LCD display or plasma display); polarizers; flexible circuits; circuit boards; plumbing; plastic films, parts or sheets (e.g., acrylonitrile-butadiene-styrene (ABS) plastic, polymethyl methacrylate, polycarbonate, or polyester); metal (e.g., painted or unpainted); ceramic; silicon; and wood.

The primer composition and/or solid primer layer may include at least one coupling agent (i.e., as an organic polymer precursor) and/or an organic polymer.

Useful coupling agents include silane coupling agents, titanate coupling agents, and zirconium-based coupling agents. These coupling agents are typically hydrolyzable (e.g., moisture curable) to form crosslinked compositions, typically organic polymers.

Examples of suitable silane coupling agents include epoxy-functional silane coupling agents such as, for example, 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)triethoxysilane, and (3-glycidoxypropyl)trimethoxysilane); mercapto-functional silane coupling agents such as, for example, 3-mercaptopropyltrimethoxysilane and 3-mercaptopropyltriethoxysilane; amine-functional silane coupling agents such as for example, N-methylaminopropyltrimethoxysilane, 4-aminobutyltriethoxysilane, N-(2-aminoethyl)-3-aminopropyltrimethoxysilane, (aminoethylaminomethyl)phenethyltrimethoxysilane, N-(2-aminoethyl)-3-aminopropyltriethoxysilane. Silane coupling agents may be made, for example, by conventional techniques, or they may be purchased from commercial suppliers such as, for example, Gelest, Inc., Morrisville, Pa.; GE Plastics, Pittsfield, Mass.; and United Chemical Technologies, Inc., Horsham, Pa.

A second type of useful coupling agent comprises organotitanates. Usable titanate coupling agents are identified in U.S. Pat. No. 4,473,671 (Green). Specific examples of the above include: isopropyl triisostearoyl titanate, isopropyl tri(lauryl-myristyl) titanate, isopropyl isostearoyl dimethacryl titanate; isopropyl tri(dodecylbenzenesulfonyl) titanate, isopropyl isostearoyl diacryl titanate, isopropyl tri(diisooctylphosphato) tri(dioctylpyrophosphato) titanate; and isopropyl triacryloyl titanate. Organotitanates may be made, for example, by conventional techniques, or they may be purchased from commercial suppliers such as, E.I. du Pont de Nemours and Co., Wilmington, Del., e.g., under the trade designation "TYZOR" (e.g., as TYZOR LA and TYZOR 131 organic titanates).

A third class of coupling agent useable according to the present invention comprises zirconium based coupling agents such as, for example, zircoaluminates as described in U.S. Pat. No. 4,539,048 (Cohen).

Upon drying, the primer composition these coupling agents may self-condense to form an organic polymer.

Figure 1:
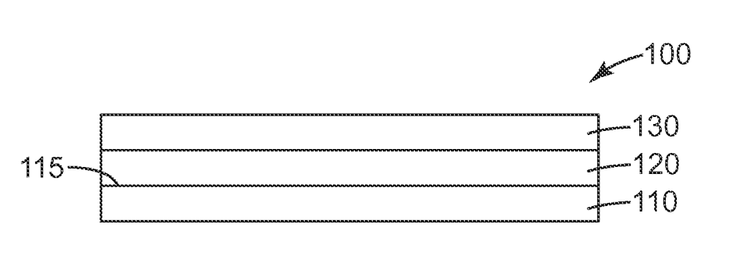
FIG. 1 is a schematic side view of an article 100 according to the present disclosure.

The amounts of each ingredient in the primer composition and solid primer layer are not particularly limited and will typically be readily determinable based on the desired properties. After evaporation of the liquid vehicle, the residual solid primer layer includes the optional beta-dicarbonyl compound, organic peroxide, and an organic polymer which may be crosslinked or non-crosslinked. In this state, the optional beta-diketone compound and organic peroxide compound are preferably immobilized and can be stored for long periods of time, typically without adverse affect. In some embodiments, the curable composition is coated onto a surface of second substrate, and the two substrates are brought together so as to sandwich the curable composition between the solid primer layer and the surface of the second substrate, thereby causing curing of the curable composition and bonding the two substrates together, as shown in FIG. 1. In other embodiments, the curable composition is applied to solid primer layer and then optionally second substrate placed on the curable composition.

Referring now to FIG. 1, article 100 comprises first substrate 110 having solid primer layer 115 and optional second substrate 130. Layer 120 comprising a reaction product of the curable composition and the optional beta-dicarbonyl and organic peroxide are disposed on surface 115. Layer 120 is disposed between first substrate 110 and second substrate 130.

Select Embodiments of the Present Disclosure

In a first embodiment, the present disclosure provides a method of curing a curable composition, the method comprising:
a) providing the curable composition, wherein the curable composition comprises:
  a free-radically polymerizable compound; and
  a quaternary ammonium halide;
  a polyvalent metal compound for free-radically curing the curable composition; and
b) providing a substrate having a solid primer layer disposed on at least a portion thereof, wherein the solid primer layer comprises:
  a binder material;
  an organic peroxide; and
c) contacting the curable composition with at least a portion of the solid primer layer, thereby causing at least partial curing of the curable composition.

In a second embodiment, the present disclosure provides a method according to the first embodiment, wherein the organic peroxide comprises cumene hydroperoxide.

In a third embodiment, the present disclosure provides a method according to the first or second embodiment, wherein the solid primer layer further comprises a beta-dicarbonyl compound represented by the formula or a salt thereof, wherein:
$X^1$ and $X^2$ independently represent a covalent bond, O, S, wherein each $R^4$ independently represents H or alkyl having from 1 to 18 carbon atoms,
$R^1$ and $R^2$ independently represent a hydrocarbyl or substituted-hydrocarbyl group having from 1 to 18 carbon atoms,
$R^3$ represents hydrogen, or a hydrocarbyl or substituted-hydrocarbyl group having from 1 to 18 carbon atoms,
or taken together any two of $R^1$, $R^2$, or $R^3$ form a five-membered or six-membered ring.

In a fourth embodiment, the present disclosure provides a method according to the third embodiment, wherein the beta-dicarbonyl compound comprises a dialkyl 2-acetylsuccinate diester having from 8 to 14 carbon atoms.

In a fifth embodiment, the present disclosure provides a method according to the third embodiment, wherein the beta-dicarbonyl compound comprises 1,3-dialkylbarbituric acid or a derivative thereof.

In a sixth embodiment, the present disclosure provides a method according to any one of the first to fifth embodiments, wherein the curable composition further comprises a photoinitiator for free-radical polymerization.

In a seventh embodiment, the present disclosure provides a method according to any one of the first to sixth embodiments, wherein the polyvalent metal compound comprises a copper (II) compound, an iron (II) compound, an iron (III) compound, a cobalt (II) compound, a cobalt (III) compound, a manganese (II) compound, or a manganese (III) compound.

In an eighth embodiment, the present disclosure provides a method according to any one of the first to seventh embodiments, wherein the free-radically polymerizable compound comprises a free-radically polymerizable polyfunctional (meth)acrylate.

In a ninth embodiment, the present disclosure provides a method according to any one of the first to eighth embodiments, wherein the binder material comprises an organic polymer.

In a tenth embodiment, the present disclosure provides an article comprising:

a first substrate having a surface having a solid primer layer disposed on at least a portion thereof, wherein the solid primer layer comprises a binder material and an organic peroxide; and a polymerized reaction product of the organic peroxide and a curable composition, wherein the curable composition comprises:

a free-radically polymerizable compound; and a quaternary ammonium halide; and a polyvalent metal compound for free-radically curing the curable composition.

In an eleventh embodiment, the present disclosure provides an article according to the tenth embodiment, wherein the polymerized reaction product contacts a second substrate, and wherein the polymerized reaction product is at least partially disposed between the first substrate and the second substrate.

In a twelfth embodiment, the present disclosure provides an article according to the eleventh embodiment, wherein the second substrate comprises glass.

In a thirteenth embodiment, the present disclosure provides an article according to any one of the tenth to twelfth embodiments, wherein the first substrate comprises glass. In a fourteenth embodiment, the present disclosure provides an article according to any one of the eleventh to thirteenth embodiments, wherein the second substrate comprises a polarizer.

In a fifteenth embodiment, the present disclosure provides an article according to any one of the tenth to fourteenth embodiments, wherein the organic peroxide comprises cumene hydroperoxide.

In a sixteenth embodiment, the present disclosure provides an article according to any one of the tenth to fifteenth embodiments, wherein the solid primer layer further comprises a beta-dicarbonyl compound represented by the formula or a salt thereof, wherein:

$X^1$ and $X^2$ independently represent a covalent bond, O, S, wherein each $R^4$ independently represents H or alkyl having from 1 to 18 carbon atoms, $R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms, and or taken together any two of $R^1$, $R^2$, or $R^3$ form a five-membered or six-membered ring.

In a seventeenth embodiment, the present disclosure provides an article according to the sixteenth embodiment, wherein the beta-dicarbonyl compound comprises a dialkyl 2-acetylsuccinate diester having from 8 to 14 carbon atoms.

In an eighteenth embodiment, the present disclosure provides an article according to the sixteenth embodiment, wherein the beta-dicarbonyl compound comprises 1,3-dialkylbarbituric acid or a derivative thereof.

In a nineteenth embodiment, the present disclosure provides an article according to any one of the tenth to eighteenth embodiments, wherein the curable composition further comprises a photoinitiator for free-radical polymerization.

In a twentieth embodiment, the present disclosure provides an article according to any one of the tenth to nineteenth embodiments, wherein the polyvalent metal compound comprises a copper (II) compound, an iron (II) compound, an iron (III) compound, a cobalt (II) compound, a cobalt (III) compound, a manganese (II) compound, or a manganese (III) compound.

In a twenty-first embodiment, the present disclosure provides an article according to any one of the tenth to twentieth embodiments, wherein the free-radically polymerizable compound comprises a free-radically polymerizable polyfunctional (meth)acrylate.

In a twenty-second embodiment, the present disclosure provides an article according to any one of the tenth to twenty-first embodiments, wherein the binder material comprises an organic polymer.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1, below lists abbreviations and sources for materials used in the Examples.

TABLE 1

| COMPOUND | DESCRIPTION AND/OR SOURCE |
|---|---|
| SSM44 | urethane acrylate oligomer, available as Art Resin SSM44, obtained from Negami Chemical Industrial Co., Ltd., Ishikawa, Japan |
| LA | lauryl acrylate, an acrylate monomer, available from Osaka Organic Chemical Industry Ltd., Osaka, Japan |
| DMAA | N,N-dimethyl acrylamide, an acrylamide monomer, available as DMAA, obtained from KJ Chemicals Corporation, Tokyo, Japan |
| 1-benzyl-5-phenyl-barbituric acid | available from Aldrich Chemical Co., Milwaukee, Wisconsin |
| DAS | dimethyl acetyl succinate, available from Alfa Aesar, Ward Hill, Massachusetts |
| Methyl Meldrum's Acid | 2,2-dimethyl-1,3-dioxane-4,6-dione, available from Aldrich Chemical Co., Milwaukee, Wisconsin |
| cumene hydroperoxide | obtained as Percumyl H-80 from NOF Corporation, Tokyo, Japan |
| TPO | diphenyl (2,4,6-trimethylbenzoyl)-phosphine oxide, available as LUCIRIN TPO, obtained from BASF, Florham Park, New Jersey |
| $NH_4Cl$ | methyltrioctyl ammonium chloride, available from Aldrich Chemical Co., Milwaukee, Wisconsin |
| CuNaphth | copper (II) naphthenate, 77% in mineral spirits, obtained from Strem Chemicals, Inc., Newburyport, Massachusetts |
| KE311 | PINECRYSTAL KE-311 hydrogenated rosin ester, obtained from Arakawa Chemical Industries, Ltd., Osaka, Japan |
| DOA | bis(2-ethylhexyl) adipate, available from Aldrich Chemical Co., Milwaukee, Wisconsin |
| AOX | tri(nonylphenyl) phosphate, obtained as ADEKASTAB 1178 from Adeka Corporation, Tokyo, Japan |
| BL-S | polyvinyl butyral resin, obtained as S-LEC BL-S from Sekisui Chemical Company Ltd., Osaka, Japan |
| EtOH | ethyl alcohol, available from Aldrich Chemical Co., Milwaukee, Wisconsin |
| BuOH | n-butyl alcohol, available from Aldrich Chemical Co., Milwaukee, Wisconsin |

Preparation of Curable Compositions A and B

Each of the following curable compositions was composed of polymerizable acrylic monomers, a hydrogenated rosin ester, a soluble copper salt, an ammonium halide salt, and an antioxidant. Compositions A and B were nearly identical, with Composition B having 2.5 times more ammonium halide salt than Composition A. Each component of the compositions was mixed in a glass bottle using a Planetary Centrifugal Mixer THINKY MIXER AR-250 from Thinky Corporation, Tokyo, Japan, for 15 minutes using mixing mode. After mixing, the bottle was checked to ensure that the individual components were fully dissolved and the composition was homogeneous. The formulations of Compositions A and B are reported in Table 2 (below).

TABLE 2

| | CURABLE COMPOSITION, weight percent of components | |
|---|---|---|
| COMPONENT | A | B |
| SSM44 | 64.5 | 64.3 |
| LA | 7.5 | 7.5 |
| DMAA | 5.3 | 5.3 |
| KE311 | 10.8 | 10.8 |
| DOA | 10.8 | 10.8 |
| CuNaphth | 0.008 | 0.008 |
| $NH_4Cl$ | 0.13 | 0.32 |
| AOX | 1.0 | 1.0 |

Preparation of Primer Compositions C-H

Primer compositions C-E were composed of a volatile liquid vehicle a polymer binder, a urethane acrylate oligomer, an organic peroxide, and a beta-dicarbonyl initiator. Compositions F-H do not include a beta-dicarbonyl molecule and Composition H also does not include an organic peroxide compound. Each of the primer compositions was prepared by mixing the components in a glass bottle using a THINKY MIXER AR-250 for 10 minutes in mixing mode, until the compositions became homogeneous and transparent. The compositions were prepared using the amounts listed in Table 3 (below).

TABLE 3

| | PRIMER COMPOSITION, parts by weight of components | | | | | |
|---|---|---|---|---|---|---|
| COMPONENT | C | D | E | F | G | H |
| EtOH | 65.6 | 66.2 | 68.7 | 69.6 | 65.6 | 75.0 |
| BuOH | 3.5 | 3.5 | 3.6 | 3.7 | 3.5 | 3.9 |
| BL-S | 11.5 | 11.6 | 12.1 | 12.2 | 11.5 | 13.2 |
| SSM44 | 6.9 | 7.0 | 7.2 | 7.3 | 6.9 | 7.9 |
| cumene hydroperoxide | 6.8 | 6.9 | 7.2 | 7.2 | 12.5 | 0 |
| DAS | 5.8 | 0 | 0 | 0 | 0 | 0 |
| Methyl Meldrum's Acid | 0 | 4.9 | 0 | 0 | 0 | 0 |
| 1-benzyl-5-phenylbarbituric acid | 0 | 0 | 1.2 | 0 | 0 | 0 |

Examples 1-6 and Comparative Examples A-B

The cure performance of primer Compositions was tested using a model image display construction. A polarizer (HLMC2-5610NHCRE, 0.125 mm thick, obtained from Sanritz Corporation, Toyama, Japan) was laminated to a 26×76×1.0 mm glass substrate, obtained as Pre-Cleaned Micro Slide Glass S1111 from Matsunami Glass Ind., Ltd., Osaka, Japan, using 3M Optically Clear Adhesive 8146-1. The primer Compositions were applied to a second glass substrate using a brush and the primer was allowed to dry in air for 30 minutes resulting in a dry (non-liquid) coating. The dry coating weight was controlled to be approximately 0.0005 g/cm2. Compositions A or B (0.4 g) were placed onto the dried primer coating and were contacted with the polarizer face of the polarizer-laminated glass substrate. Polyethylene terephthalate spacer shims were used to maintain a constant thickness of 0.004 inch (0.1 mm) between the primed-glass substrate and the polarizer. The state of the adhesive was observed 30 and 60 minutes after bonding and the constructions were destroyed after 24 hours to determine the final state of cure of the adhesive. The percentage given after 24 hours represents the portion of the construction that cured into an immovable solid. The results of these tests are shown in Table 4 (below).

TABLE 4

| | CURABLE COMPO-SITION | PRIMER COMPO-SITION | β-DIKETONE IN PRIMER? | STATE OF ADHESIVE | | |
|---|---|---|---|---|---|---|
| | | | | 30 Minutes | 60 Minutes | 24 Hours |
| EXAMPLE 1 | A | C | yes | viscous liquid | elastic solid | 80% solid |
| EXAMPLE 2 | B | C | yes | viscous liquid | elastic solid | 80% solid |
| EXAMPLE 3 | A | D | yes | elastic solid | elastic solid | 95% solid |
| EXAMPLE 4 | A | E | yes | viscous liquid | elastic solid | 80% solid |
| EXAMPLE 5 | A | F | no | liquid | viscous liquid | 85% solid |
| EXAMPLE 6 | B | F | no | elastic solid | elastic solid | 100% solid |
| COMPARATIVE EXAMPLE A | A | H | no | liquid | liquid | 0% solid |
| COMPARATIVE EXAMPLE B | B | H | no | liquid | liquid | 0% solid |

Preparation of Curable Compositions I-L

Each of the following curable compositions was composed of polymerizable acrylic monomers, a hydrogenated rosin ester, a soluble copper salt, an ammonium halide salt, an antioxidant, and a photoinitiator. The amounts of the ammonium halide salt and the soluble copper salt were varied in each Composition. Each component of the compositions was mixed in a glass bottle using a Planetary Centrifugal Mixer THINKY MIXER AR-250 for 15 minutes using mixing mode. After mixing, the bottle was checked to ensure that the individual components were fully dissolved and the composition was homogeneous. The formulations of Compositions I-L are reported in Table 5 (below).

TABLE 5

| | CURABLE COMPOSITION, weight percent of components | | | |
|---|---|---|---|---|
| COMPONENT | I | J | K | L |
| SSM44 | 63.8 | 63.9 | 63.7 | 63.8 |
| LA | 7.4 | 7.5 | 7.4 | 7.4 |
| DMAA | 5.3 | 5.3 | 5.3 | 5.3 |
| KE311 | 10.7 | 10.7 | 10.7 | 10.7 |
| DOA | 10.7 | 10.7 | 10.7 | 10.7 |
| CuNaphth | 0.008 | 0.008 | 0.008 | 0.026 |
| $NH_4Cl$ | 0.13 | 0 | 0.32 | 0.13 |
| AOX | 1.0 | 1.0 | 1.0 | 1.0 |
| TPO | 1.0 | 1.0 | 1.0 | 1.0 |

Examples 7-14 and Comparative Example C-E

The cure performance of curable Compositions I-L on primer Compositions C-H was tested using a model image display construction. A polarizer (HLMC2-5610NHCRE, 0.125 mm thick, obtained from Sanritz Corporation, Toyama, Japan) was laminated to a 26×76×1.0 mm glass substrate, obtained as Pre-Cleaned Micro Slide Glass S1111 from Matsunami Glass Ind., Ltd., Osaka, Japan, using 3M Optically Clear Adhesive 8146-1. Primer Compositions C-H were applied to a second glass substrate using a brush and the primer was allowed to dry in air for 30 minutes resulting in a dry (non-liquid) coating. The dry coating weight was controlled to be approximately 0.0005 g/cm². Curable Compositions I-L (0.4 g) were placed onto the dried primer coating and were contacted with the polarizer face of the polarizer-laminated glass substrate. Polyethylene terephthalate spacer shims were used to maintain a constant thickness of 0.004 inch (0.1 mm) between the primed-glass substrate and the polarizer. Construction and evaluation of Examples 7-14 and Comparative Examples C-E was conducted in a low-light environment to minimize UV exposure to the adhesive. The state of the adhesive was observed 30 and 60 minutes after bonding and the constructions were destroyed after 24 hours to determine the final state of cure of the adhesive. The results of these tests are shown in Table 6 (below).

TABLE 6

| EXAMPLE | CURABLE COMPO- SITION | PRIMER COMPO- SITION | β-DIKETONE IN PRIMER? | STATE OF ADHESIVE | | |
|---|---|---|---|---|---|---|
| | | | | 30 Minutes | 60 Minutes | 24 Hours |
| 7 | I | C | yes | liquid | elastic solid | 80% solid |
| 8 | K | C | yes | elastic solid | elastic solid | 100% solid |
| 9 | I | D | yes | elastic solid | elastic solid | 100% solid |
| 10 | I | E | yes | viscous liquid | elastic solid | 100% solid |
| 11 | I | F | no | liquid | liquid | 25% solid |
| 12 | K | F | no | viscous liquid | elastic solid | 90% solid |
| 13 | K | G | no | elastic solid | elastic solid | 100% solid |
| 14 | L | F | no | elastic solid | elastic solid | 100% solid |
| COMPARATIVE EXAMPLE C | J | F | no | liquid | liquid | 0% solid |
| COMPARATIVE EXAMPLE D | I | H | no | liquid | liquid | 0% solid |
| COMPARATIVE EXAMPLE E | K | H | no | liquid | liquid | 0% solid |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of curing a curable composition, the method comprising:
    a) providing the curable composition, wherein the curable composition comprises:
       a free-radically polymerizable compound; and
       a quaternary ammonium halide;
       a polyvalent metal compound for free-radically curing the curable composition; and
    b) providing a substrate having a solid primer layer disposed on at least a portion thereof, wherein the solid primer layer comprises:
       a binder material; and
       an organic peroxide; and
    c) contacting the curable composition with at least a portion of the solid primer layer, thereby causing at least partial curing of the curable composition.

2. The method of claim 1, wherein the organic peroxide comprises cumene hydroperoxide.

3. The method of claim 1, wherein the solid primer layer further comprises a beta-dicarbonyl compound represented by the formula or a salt thereof, wherein:

$X^1$ and $X^2$ independently represent a covalent bond, O, S, wherein each $R^4$ independently represents H or alkyl having from 1 to 18 carbon atoms, $R^1$ and $R^2$ independently represent a hydrocarbyl or substituted-hydrocarbyl group having from 1 to 18 carbon atoms, $R^3$ represents hydrogen, or a hydrocarbyl or substituted-hydrocarbyl group having from 1 to 18 carbon atoms, or taken together any two of $R^1$, $R^2$, or $R^3$ form a five-membered or six-membered ring.

4. The method of claim 3, wherein the beta-dicarbonyl compound comprises a dialkyl 2-acetylsuccinate diester having from 8 to 14 carbon atoms.

5. The method of claim 3, wherein the beta-dicarbonyl compound comprises 1,3-dialkylbarbituric acid or a derivative thereof.

6. The method of claim 1, wherein the curable composition further comprises a photoinitiator for free-radical polymerization.

7. The method of claim 1, wherein the polyvalent metal compound comprises a copper (II) compound, an iron (II) compound, an iron (III) compound, a cobalt (II) compound, a cobalt (III) compound, a manganese (II) compound, or a manganese (III) compound.

8. The method of claim 1, wherein the free-radically polymerizable compound comprises a free-radically polymerizable polyfunctional (meth)acrylate.

9. The method of claim 1, wherein the binder material comprises an organic polymer.

* * * * *

UNITED STATES PATENT AND TRADEMARK OFFICE
CERTIFICATE OF CORRECTION

PATENT NO. : 10,344,169 B2
APPLICATION NO. : 15/508360
DATED : July 9, 2019
INVENTOR(S) : Yoshihiko Tasaka et al.

It is certified that error appears in the above-identified patent and that said Letters Patent is hereby corrected as shown below:

On the Title Page

Page 2, Column 2 item (56) (Other Publications)
Line 5, Delete "XlV$^{th}$" and insert -- XIV$^{th}$ --, therefor.

In the Specification

Column 6
Line 36, Delete "O,O-alkyl" and insert -- O,O-t-alkyl --, therefor.

Column 6
Line 42, Delete "O,O-butyl" and insert -- O,O-t-butyl --, therefor.

Column 6
Lines 44-45, Delete "O,O-butyl" and insert -- O,O-t-butyl --, therefor.

Column 8
Line 2, Delete "R$^3$=H," and insert -- R$^3$=H, --, therefor.

Column 8
Line 9, Delete "R$^4$=H," and insert -- R$^4$=H, --, therefor.

Signed and Sealed this
Eighteenth Day of February, 2020

Andrei Iancu
*Director of the United States Patent and Trademark Office*